United States Patent
Matsuura

(10) Patent No.: US 11,850,892 B2
(45) Date of Patent: Dec. 26, 2023

(54) PNEUMATIC TIRE

(71) Applicant: Sumitomo Rubber Industries, Ltd., Kobe (JP)

(72) Inventor: Koji Matsuura, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 85 days.

(21) Appl. No.: 17/207,800

(22) Filed: Mar. 22, 2021

(65) Prior Publication Data

US 2021/0323359 A1    Oct. 21, 2021

(30) Foreign Application Priority Data

Apr. 17, 2020    (JP) .................................. 2020-074290

(51) Int. Cl.
*B60C 15/00* (2006.01)
*B60C 15/06* (2006.01)

(52) U.S. Cl.
CPC ...... *B60C 15/0628* (2013.01); *B60C 15/0036* (2013.01); *B60C 2015/0685* (2013.01)

(58) Field of Classification Search
CPC . B60C 15/06; B60C 15/0632; B60C 15/0628; B60C 9/02; B60C 2009/0223; B60C 2009/0215; B60C 15/0018; B60C 15/0072; B60C 2015/0614; B60C 2015/0621; B60C 2015/065
See application file for complete search history.

(56) References Cited

U.S. PATENT DOCUMENTS

| | | | | |
|---|---|---|---|---|
| 4,319,621 | A | * | 3/1982 | Motomura ................ B60C 9/09 152/542 |
| 2011/0186201 | A1 | | 8/2011 | Buxton et al. |
| 2015/0306920 | A1 | * | 10/2015 | Kuriyama ........... B60C 15/0036 152/554 |
| 2017/0072750 | A1 | * | 3/2017 | Munezawa ......... B60C 15/0603 |
| 2020/0001665 | A1 | * | 1/2020 | Hamada ............. B60C 15/0603 |
| 2021/0031570 | A1 | * | 2/2021 | Kagaya ................ B60C 13/009 |
| 2021/0101419 | A1 | | 4/2021 | Arima |

FOREIGN PATENT DOCUMENTS

| | | | |
|---|---|---|---|
| EP | 0949091 A2 | 10/1999 | |
| EP | 1201463 A2 | 5/2002 | |
| EP | 1849626 A1 | * 10/2007 | ......... B60C 15/0045 |

(Continued)

OTHER PUBLICATIONS

Extended European Search Report, dated Jul. 13, 2021, for European Application No. 21161658.6.

*Primary Examiner* — Cedrick S Williams
(74) *Attorney, Agent, or Firm* — Birch, Stewart, Kolasch & Birch, LLP

(57) ABSTRACT

A pneumatic tire comprises a carcass, a bead apex rubber, and a bead reinforcing cord layer. The bead apex rubber has a radially outer edge positioned at a radial height of 15% to 25% of the tire section height. The bead reinforcing cord layer comprises an axially inner first part disposed on the axially outside of a carcass ply main portion, and an axially outer second part disposed on the axially inside of a carcass ply turned-up portion. The radially outer edge of the axially outer second part is radially outwardly spaced apart from the radially outer edge of the carcass ply turned-up portion by at least 5 mm.

20 Claims, 5 Drawing Sheets

(56) References Cited

FOREIGN PATENT DOCUMENTS

| EP | 3354487 A1 | | 8/2018 | |
|---|---|---|---|---|
| JP | 2013-129346 A | | 7/2013 | |
| JP | 2014125144 A | * | 7/2014 | |
| JP | 2018140710 A | * | 9/2018 | ............ B60C 15/00 |
| WO | WO 2019/0230401 A1 | | 12/2019 | |

* cited by examiner

PNEUMATIC TIRE

CROSS-REFERENCE TO RELATED APPLICATION

This application claims the benefit of foreign priority to Japanese Patent Application No. 2020-074290, filed 17 Apr. 2020, which is incorporated by reference in its entirety for all purposed.

TECHNICAL FIELD

The present invention relates to a pneumatic tire.

BACKGROUND ART

If the weight of pneumatic tires mounted on a vehicle is large, the unsprung mass of the vehicle increases, which may adversely affect the steering stability of the vehicle and the durability of the undercarriage. In the case of racing tires used under severe conditions, in particular, the above-mentioned influence is remarkable. Thus, weight reduction is strongly desired for such tires.

In order to reduce the weight of a tire, there have been adopted a technique of reducing the thickness of the sidewall portions, and a technique of lowering the turned-up height of the carcass ply, for example.

Patent Document 1: Japanese Patent Application Publication No. 2013-129346

SUMMARY OF THE INVENTION

Problems to be Solved by the Invention

However, according to the above-mentioned techniques, there is a possibility that the rigidity of the tire is decreased, and a decrease in the tire rigidity may cause deterioration in the grip performance during cornering and the durability of the tire.

The present invention was therefore, made in view of the above circumstances, and a primary objective of the present invention is to provide a pneumatic tire of which weight can be reduced without deteriorating the durability.

According to the present invention, a pneumatic tire comprises:
a pair of bead portions with a bead core embedded therein,
a carcass extending between the pair of bead portions, and
a bead apex rubber disposed in each of the bead portions and extending radially outwardly from the bead core therein, and
a bead reinforcing cord layer disposed in each of the bead portions and composed of a ply of cords,
wherein
the carcass comprises a first carcass ply extending between the bead portions and turned up around the bead core in each of the bead portions from the axially inside to the axially outside so as to have a pair of turned-up portions and a main portion therebetween,
the bead apex rubber has a radially outer edge at a radial height of from 15% to 25% of a tire section height, each height measured radially outwardly from the bead base line,
the bead reinforcing cord layer comprises
an axially inner first part disposed on the axially outside of the main portion of the first carcass ply, and
an axially outer second part disposed on the axially inside of the turned-up portion of the first carcass ply and extending from the axially inner first part trough a radially inner side of the bead core, and
the axially outer second part has a radially outer edge which is radially outwardly spaced apart from the radially outer edge of the turned-up portion by at least 5 mm in a radial direction of the tire.

It is preferable that the bead reinforcing cord layer has a contact section where its axially inner first part and axially outer second part are in contact with each other.

It is preferable that the radially outer edge of the axially inner first part is radially outwardly spaced apart from the radial outer edge of the axially outer second part by at least 5 mm in the radial direction of the tire.

It is preferable that the radially outer edge of the bead reinforcing cord layer is positioned at a radial height of from 45% to 60% of the tire section height, each height measured radially outwardly from the bead base line.

It is preferable that the radially outer edge of the turned-up portion is positioned at a radial height of from 30% to 45% of the tire section height, each height measured radially outwardly from the bead base line.

It is preferable that each of the bead portions is provided, axially outside the turned-up portion, with an axially outer rubber layer.

It is preferable that the axially outer rubber layer has a radially outer edge positioned radially outside the radially outer edge of the bead reinforcing cord layer.

It is preferable that the radially outer edge of the axially outer rubber layer is radially outwardly spaced apart from the radial outer edge of the bead reinforcing cord layer by at least 5 mm in the radial direction of the tire.

It is preferable that a complex elastic modulus E*2 of the axially outer rubber layer is not smaller than a complex elastic modulus E*1 of the bead apex rubber.

It is preferable that the complex elastic modulus E*2 of the axially outer rubber layer is in a range from 125% to 175% of the complex elastic modulus E*1 of the bead apex rubber.

It is preferable that the radially outer edge of the axially outer rubber layer is positioned at a radial height of from 55% to 70% of the tire section height, each height measured radially outwardly from the bead base line.

It is preferable that the carcass comprises a second carcass ply disposed outside the first carcass ply and extending between the bead portions.

It is preferable that the carcass comprises a second carcass ply disposed inside the first carcass ply and extending between the bead portions and turned up around the bead core in each bead portion from the axially inside to the axially outside so as to have a pair of turned-up portions and a main portion therebetween.

And the radially outer edges of the turned-up portions of the second carcass ply are preferably disposed radially outside the radially outer edges of the respective bead reinforcing cord layers.

DESCRIPTION OF THE PREFERRED EMBODIMENTS

Figure 1:
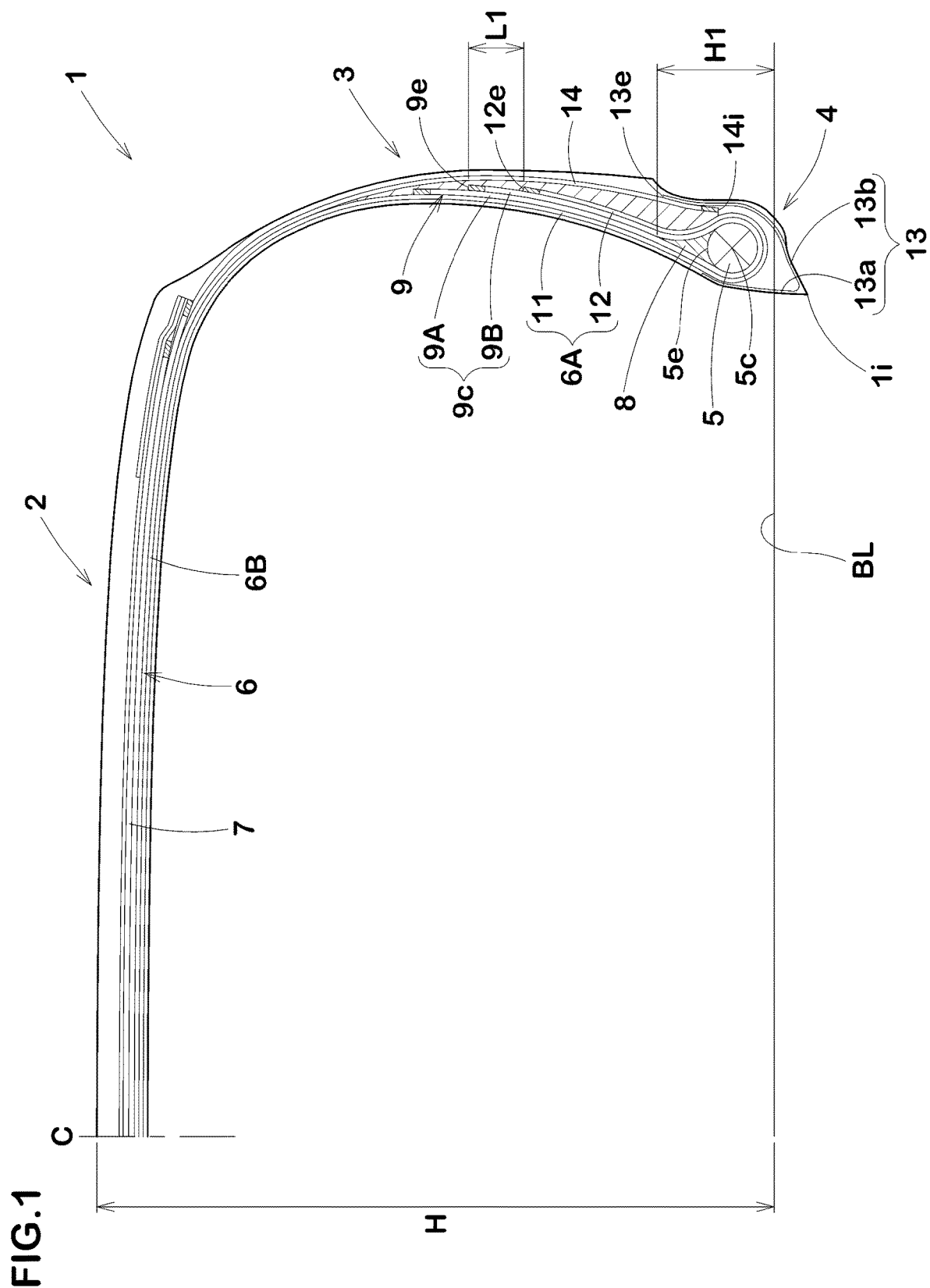
FIG. 1 is a cross-sectional view of a pneumatic tire as an embodiment of the present invention.

Embodiments of the present invention will now be described in conjunction with accompanying drawings.
FIG. 1 is a cross-sectional view of a part of a pneumatic tire 1 as an embodiment of the present invention taken in a tire meridian section including the tire rotational axis under its normally inflated unloaded condition.
The tire 1 in the present embodiment is designed as a low aspect racing tire. However, the present invention may be applied to passenger car tires, heavy duty vehicle tires such as truck/bus tires and the like The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

However, if there is no applicable standard, the wheel rim and air pressure recommended by the tire manufacturer are applied to the standard wheel rim and the standard pressure.

In this application including specification and claims, various dimensions, positions and the like of the tire refer to those under the normally inflated unloaded condition of the tire unless otherwise noted.

The pneumatic tire 1 comprises a tread portion 2, a pair of sidewall portions 3, a pair of bead portions 4 with a bead core 5 embedded therein, a carcass 6 extending between the bead portions 4 through the tread portion 2 and the sidewall portions 3, a bead apex rubber 8 disposed in each of the bead portions 4 and extending radially outwardly from the bead core 5 therein, and a bead reinforcing cord layer 9 disposed in each of the bead portions 4 and comprising a ply 9c of cords.

The carcass 6 comprises a first carcass ply 6A extending between the bead portions 4 and turned up around the bead core 5 in each of the bead portions 4 from the inside to the outside in the tire axial direction so as to from a pair of turned-up portions 12 and a main portion 11 therebetween.

The bead apex rubber 8 has a radially outer edge 12e positioned at a radial height H1 of from 15% to 25% of the tire section height H, each measured radially outwardly from the bead base line BL, in order to reduce the weight of the tire 1. Here, the bead base line BL is a straight line drawn parallel with the axial direction of the tire in a tire meridian section as shown in FIG. 1, passing through a radial position corresponding to the rim diameter of the standard rim.

The bead reinforcing cord layer 9 has an axially inner first part 9A disposed on the axially outside of the main portion 11, and an axially outer second part 9B disposed on the axially inside of the carcass ply turned-up portion 12 and continued from the axially inner first part 9A through a radially inner side of the bead core 5.

The bead reinforcing cord layer 9 increases the bending rigidity of the bead portion 4 in cooperation with the carcass 6, the bead apex rubber 8 and the bead core 5.

It is preferable that the radial height H1 of the radially outer edge 8e of the bead apex rubber 8 is not less than 18%, but not more than 22% of the tire section height H. If the radial height H1 of the bead apex rubber 8 is increased, the effect of reducing the tire weight may be reduced. If the radial height H1 of the bead apex rubber 8 becomes reduced, the durability of the bead portion 4 may be decreased.

The radially outer edge 9e of the axially outer second part 9B is radially outwardly spaced apart from the radially outer edge 12e of the carcass ply turned-up portion 12 by 5 mm or more in the tire radial direction. Thereby, the stress in the bead portion 4 during traveling is dispersed, and the durability of the bead portion 4 is improved.

The pneumatic tire 1 is provided with a belt layer 7 disposed radially outside the carcass 6 in the tread portion 2, and a chafer 13 disposed in each of the bead portions 4.

The chafer 13 extends along the axially outer surface, bottom surface and axially inner surface of the bead portion through the bead toe end 1i as shown in FIG. 1, defining
an axially inner portion 13a extending radially outwardly from the bead toe end 1i on the axially inner side of the carcass ply main portion 11, and
an axially outer portion 13b extending radially outwardly from the bead toe end 1i on the axially outer side of the carcass ply turned-up portion 12.

The axially outer portion 13b has a radially outer edge 13e positioned at substantially the same radial height as that of the radially outer edge 8e of the bead apex rubber 8. Thereby, the rigidity in the vicinity of the bead apex rubber 8 on which a larger lateral force acts during cornering is increased, and the durability can be improved.
The "substantially the same height" means that the distance La (shown in FIG. 2) in the tire radial direction between the radially outer edge 13e of the chafer 13 and the radially outer edge 8e of the bead apex rubber 8 is not more than 3 mm.

Preferably, the radially outer edge 12e of the carcass ply turned-up portion 12 is positioned at a radial height in a range from 30% to 45% of the tire section height H, each measured radially outwardly from the bead base line BL. By setting the radial height to 30% or more of the tire section height H, the durability of the bead portion 4 can be improved. By setting the radially height to 45% or less of the tire section height H, the weight of the tire 1 can be reduced.

In the present embodiment, the carcass 6 further comprises a second carcass ply 6B disposed outside the first carcass ply 6A. In other words, the second carcass ply 6B is positioned radially outside the first carcass ply 6A in the tread portion 2, and axially outside the first carcass ply 6A in each sidewall portion 3.

The second carcass ply 6B extends between the bead portions 4 through the tread portion 2 and the sidewall portions 3 without being turned up around the respective bead cores 5. Thus, the second carcass ply 6B is made up of only a main portion 14 extending between the bead cores 5, and turned-up portions like the turned-up portions 12 are not included. Both edges (radially inner ends) 14i of the second carcass ply 6B are terminated in the respective bead portions 4. In this example, the radially inner end 14i is positioned radially inside the radially outermost end 5e of the bead core 5 in order to increase the rigidity of the bead portion 4.

Further, the radially inner end 14i in this example is positioned radially outside the intermediate position 5c in the tire radial direction, of the bead core 5.

In this example, the radially inner end 14i is positioned axially inside the radially outer edge 13e of the axially outer portion 13b of the chafer 13.

The second carcass ply 6B is disposed so as to come into contact with the axially outer portion 13b of the chafer 13. Thereby, the durability of the bead portion 4 is further improved.

Each of the first carcass ply 6A and the second carcass ply 6B is composed of a ply of carcass cords arranged radially at an angle in a range from 70 to 90 degrees with respect to the tire circumferential direction and rubberized with a topping rubber. For example, organic fiber cords such as nylon, polyester and rayon, and steel cords are preferably used as the carcass cords.

In the present embodiment, the bead core 5 has a circular cross-sectional shape. The bead core 5 is formed in a ring shape, for example, by spirally winding a rubberized bead wire (not shown). The cross-sectional shape of the bead core 5 is not limited to a circular shape, and may be a rectangular shape or a hexagonal shape, for example.

Figure 2:
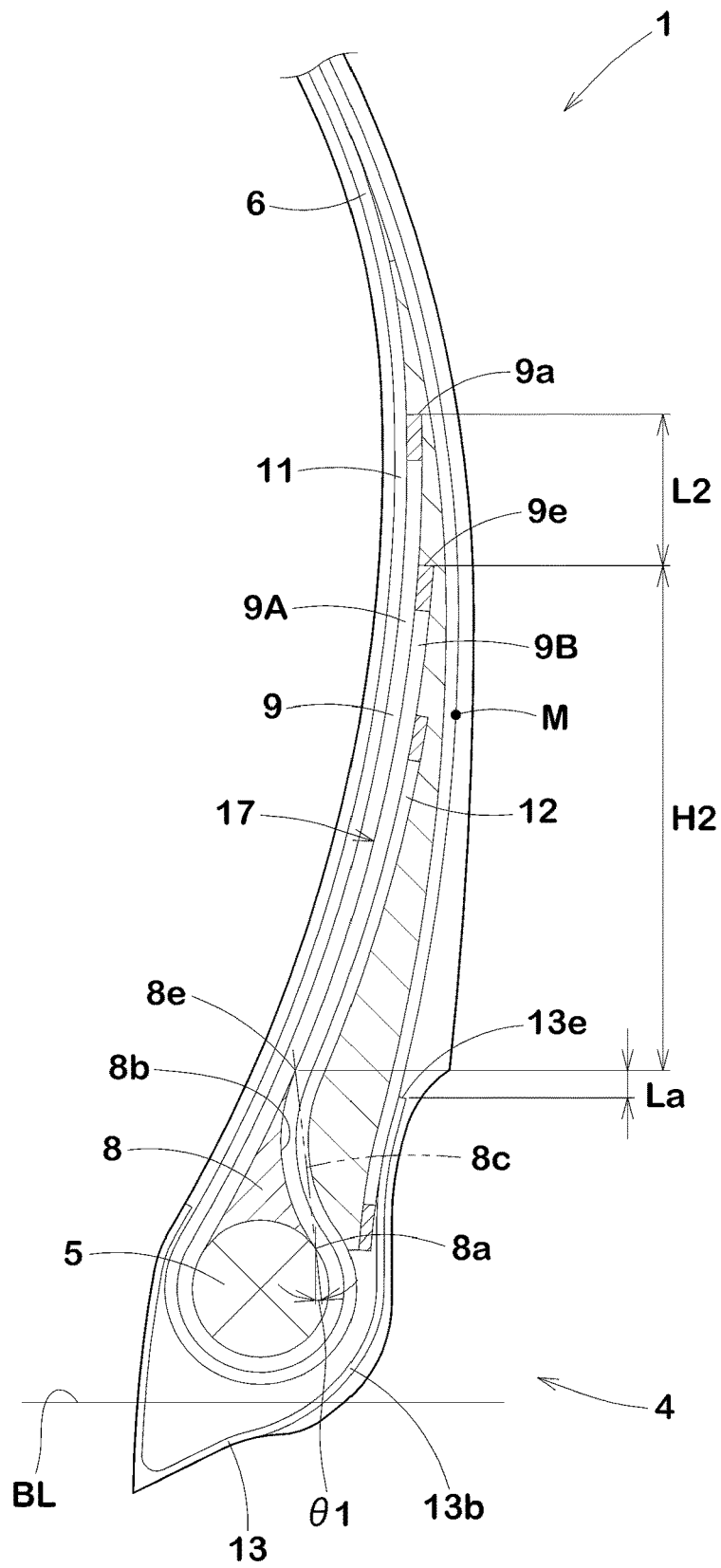
FIG. 2 and FIG. 3 are the same cross-sectional views differently annotated to show a bead portion of the pneumatic tire shown in FIG. 1

In the cross section of the bead apex rubber 8, as shown in FIG. 2, the bead apex rubber 8 has an axially outermost end 8a positioned on the bead core 5, and an axially outer surface 8b extending between the axially outermost end 8a and the radially outer edge (radially outermost end) 8e.

In the bead apex rubber 8 in this example, the axially outer surface 8b is curved concavely toward the axially inside in the cross section. For example, the axially outer surface 8b is formed as a smoothly curved arcuate surface.

When the tire is subjected to a large lateral force during cornering for example, such bead apex rubber 8 causes tensile stress in the cords of the bead reinforcing cord layer 9 and the carcass ply turned-up portion 12 rather than compressive stress, so the bead durability is further improved. The axially outer surface 8b is however, not limited to such concave surface.

The axially outer surface 8b extends radially outwardly from the axially outermost end 8a, while inclining toward the axial inside. The inclination angle θ1 of a straight line 8c drawn between the axially outermost end 8a and the radially outer edge (radially outermost end) 8e is in a range from 5 to 25 degrees with respect to the tire radial direction. Such axially outer surface 8b can effectively bring out the above-mentioned effect.

It is preferable that a complex elastic modulus E*1 of the bead apex rubber 8 is larger than a complex elastic modulus E*a of the topping rubber of the carcass 6.

The complex elastic modulus E*1 of the bead apex rubber 8 is preferably not less than 40 MPa, more preferably not less than 60 MPa, but preferably not more than 120 MPa, more preferably not more than 100 MPa. Such bead apex rubber 8 can increases the bending rigidity of the bead portion 4. Thus, such bead apex rubber 8 is suitably used for a tire 1 for racing.

Here, the complex elastic modulus E* is measured according to the Japanese Industrial standard (JIS) K 6394, using a viscoelastic spectrometer (a testing machine manufactured by GABO) under the following measurement conditions:

Initial strain: 5%
Amplitude: +/−1.0%
Frequency: 10 Hz
Deformation mode: tensile deformation
Measurement temperature: 30 degrees C.

In the bead reinforcing cord layer 9 in this example, the axially inner first part 9A is in contact with the carcass ply main portion 11 and the bead apex rubber 8, and the axially outer second part 9B is in contact with the carcass ply turned-up portion 12 and the bead apex rubber 8

The bead reinforcing cord layer 9 is composed of a ply of reinforcing cords covered with reinforcing rubber (not shown). The reinforcing cords are inclined at an angle, which is smaller than the angle of the carcass cords, with respect to the tire circumferential direction, for example, at an angle of from 20 to 70 degrees, preferably 30 to 60 degrees, and more preferably 40 to 50 degrees. For example, organic fiber cords such as nylon, polyester and rayon, and steel cords are preferably used as the reinforcing cords. It is preferable that the reinforcing rubber has a complex elastic modulus E*b smaller than the complex elastic modulus E*1 of the bead apex rubber 8.

The bead reinforcing cord layer 9 has a contact section 17 in which the axially inner first part 9A and the axially outer second part 9B are in contact with each other. The contact section 17 is formed between the radially outer edge 8e of the bead apex rubber 8 and the radially outer edge 9e of the axially outer second part 9B. Such contact section 17 suppresses an increase in the weight of the tire 1 while increasing the bending rigidity of the bead portion 4.

The radial dimension H2 of the contact section 17 is preferably not less than 15%, more preferably not less than 20%, but preferably not more than 35%, more preferably not more than 30% of the tire section height H.

It is preferable that the radially outer edge 9a of the axially inner first part 9A is radially outwardly spaced apart from the radially outer edge 9e of the axially outer second part 9B by at least 5 mm in the tire radial direction in order to prevent stress concentration during traveling.

But, the radial distance L2 between the radially outer edges 9a and 9e is preferably set to be not more than 15 mm.

It is also preferable that the radial distance L2 between the radially outer edges 9a and 9e is substantially the same as the radial distance L1 (shown in FIG. 1) between the radially outer edge 9e of the axially outer second part 9B and the radially outer edge 12e of the carcass ply turned-up portion 12. Here, the "substantially the same" means that the absolute value |L1-L2| of the difference between the distances L1 and L2 is not more than 2 mm.

Although not particularly limited, in the present embodiment, the radially outer edge 9a of the axially inner first part 9A and the radially outer edge 9e of the axially outer second part 9B are disposed radially outside a maximum width position M.

The maximum width position M is a position in the tire radial direction at which the cross sectional width of the carcass 6 in a tire meridian section under the normally inflated unloaded condition becomes maximum.

It is preferable that the radially outermost end of the bead reinforcing cord layer 9, which is the radially outer edge 9a of the axially inner first part 9A in this embodiment, is disposed at a radial height of from 45% to 60% of the tire section height H, each measured radially outwardly from the bead base line BL.

By setting the radial height of the radially outer edge 9a to 45% or more of the tire section height H, the durability of the bead portion 4 is enhanced.

By setting the radial height of the radially outer edge 9a to 60% or less of the tire section height H, an excessive increase in the weight of the tire 1 is suppressed.

From these points of view, the radial height of the radially outer edge 9a is more preferably not less than 50%, but not more than 55% of the tire section height H.

The bead portions 4 are each provided with an axially outer rubber layer 10 on the axially outer side of the carcass ply turned-up portion 12 in order to increase the bending rigidity against a bending force to the carcass 6 and the bead reinforcing cord layer 9. In the present embodiment, the axially outer rubber layer 10 is disposed between the carcass ply turned-up portion 12 and the second carcass ply 6B.

Figure 3:
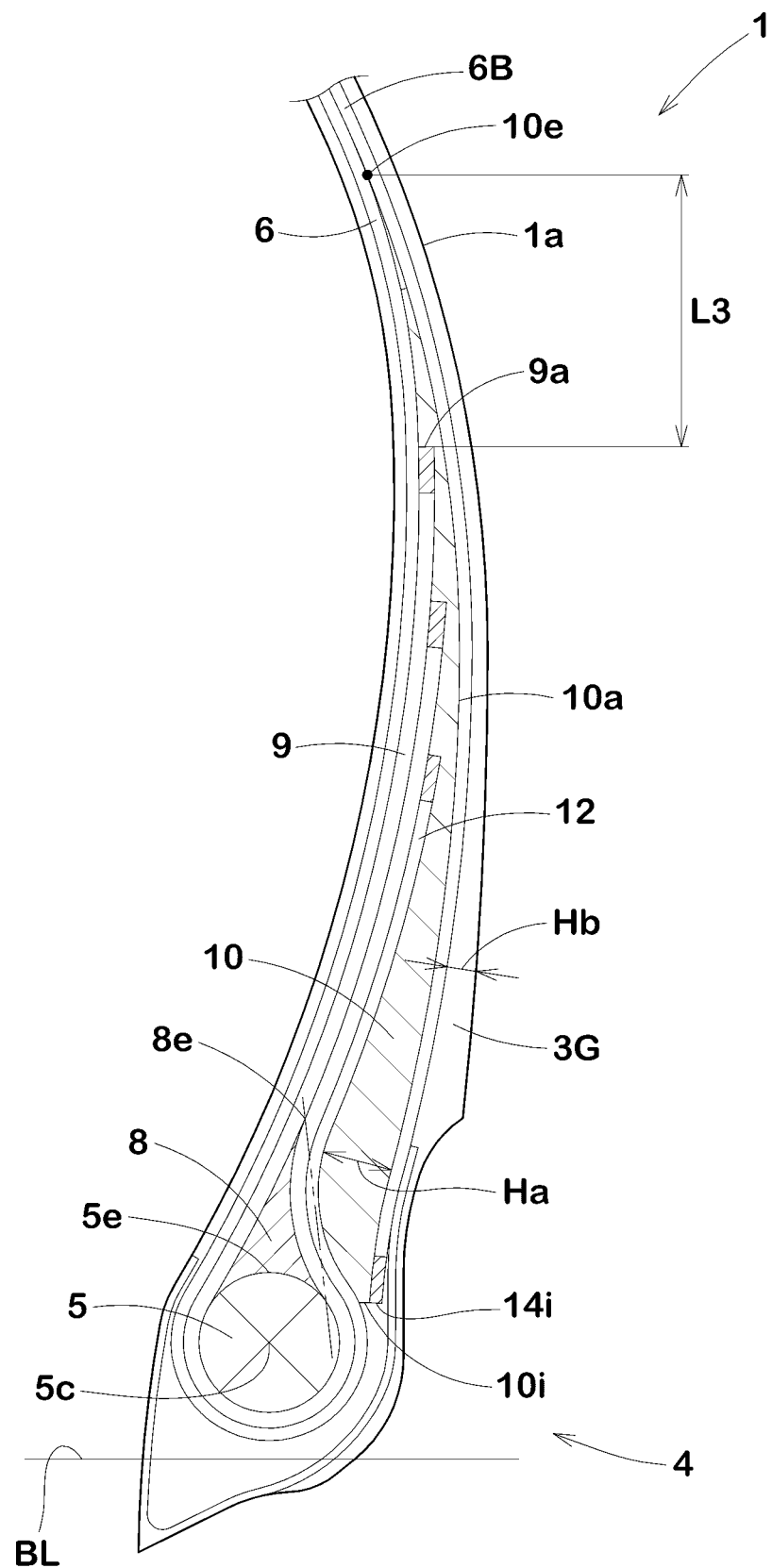

As shown in FIG. 3, the radially outer edge 10e of the axially outer rubber layer 10 is preferably disposed radially outside the radially outermost end (edge 9a) of the bead reinforcing cord layer 9 in order to further increase the bending rigidity of the bead portion 4.

It is preferable that the radially outer edge 10e of the axially outer rubber layer 10 is radially outwardly spaced apart from the radially outer edge 9a of the bead reinforcing cord layer 9 by at least 5 mm in the tire radial direction. But, the radial distance L3 between the radially outer edges 10e and 9a is preferably set to be not more than 15 mm.

Thereby, the improvement in the durability and reduction of the tire weight can be achieved in a well-balanced manner. Further, in the present embodiment, since the radial distances L1, L2 and L3 are set to be at least 5 mm in the tire radial direction, the stress in the bead portion 4 during traveling is effectively dispersed, and excellent durability is exhibited.

In order to effectively exert the above-mentioned advantageous effects, the radially outer edge 10e of the axially outer rubber layer 10 is preferably disposed at a radial height of not less than 55%, but not less than 60% of the tire section height H, each measured radially outwardly from the bead base line BL.

Further, the radial height of the radially outer edge 10e is preferably set to be not more than 70%, more preferably not more than 65% of the tire section height H.

On the other hand, the radially inner edge 10i of the axially outer rubber layer 10 is disposed at a radial height between the radially outermost end 5e and intermediate position (or centroid) 5c of the bead core 5.

Further, the radially inner edge 10i of the axially outer rubber layer 10 is disposed at the same position in the tire radial direction as the radially inner edge 14i of the second carcass ply 6B in the present embodiment.

When the thickness of the axially outer rubber layer 10 is measured perpendicularly to its axially outer surface 10a, it is preferable that the maximum Ha of the thickness is not less than 3 mm, more preferably not less than 3.5 mm, but not more than 6 mm, more preferably not more than 5.5 mm. In this embodiment, the axially outer surface 10a of the axially outer rubber layer 10 in contact with the axially inner surface of the second carcass ply 6B.

It is preferable that the axially outer rubber layer 10 has a complex elastic modulus $E^{*2}$ which is equal to or higher than the complex elastic modulus $E^{*1}$ of the bead apex rubber 8 in order to further increase the bending rigidity of the bead portion 4 and thereby greatly improve the durability.

If the complex elastic modulus $E^{*2}$ is excessively large, the rigidity difference between the radially inside and outside of the radially outer edge 8e of the bead apex rubber 8 becomes large, and as a result, the durability may be deteriorated. From such perspective, the complex elastic modulus $E^{*2}$ of axially outer rubber layer 10 is preferably not less than 125%, more preferably not less than 135%, but preferably not more than 175%, more preferably not more than 170% of the complex elastic modulus $E^{*1}$ of the bead apex rubber 8.

Further, in each of the sidewall portions 3, a sidewall rubber 3G is disposed axially outside the axially outer rubber layer 10. The sidewall rubber 3G forms a part of the outer surface 1a of the tire 1 in the sidewall portion 3.

In the present embodiment, the sidewall rubber 3G is disposed on the axially outside of the second carcass ply 6B, thus without directly contacting with the axially outer rubber layer 10. In the present embodiment, the rubber thickness Hb of the sidewall rubber 3G is preferably set in a range from 0.8 to 2.0 mm although not particularly limited thereto.

Figure 4:
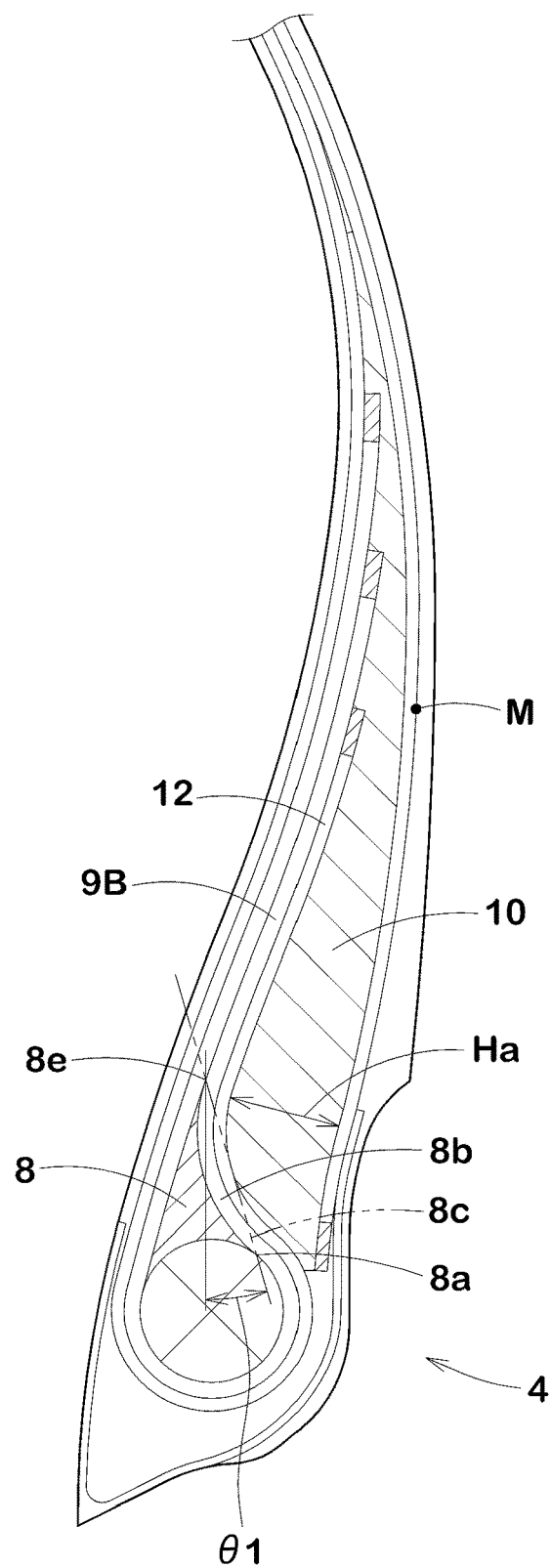
FIG. 4 is a cross-sectional view of a bead portion of a pneumatic tire as another embodiment of the present invention.

FIG. 4 is a cross-sectional view of the bead portion 4 of another embodiment of the present invention. The same components as those of the former embodiment are denoted by the same reference numerals, and the description thereof will be omitted.

In this embodiment, as shown in FIG. 4, the angle θ1 of the axially outer surface 8b of the bead apex rubber 8 is larger than that in the former embodiment. Such axially outer surface 8b causes larger tensile stress in the cords of the axially outer second part 9B and the carcass ply turned-up portion 12 during cornering. Further, such axially outer surface 8b can increase the maximum Ha of the thickness of the axially outer rubber layer 10.

Figure 5:
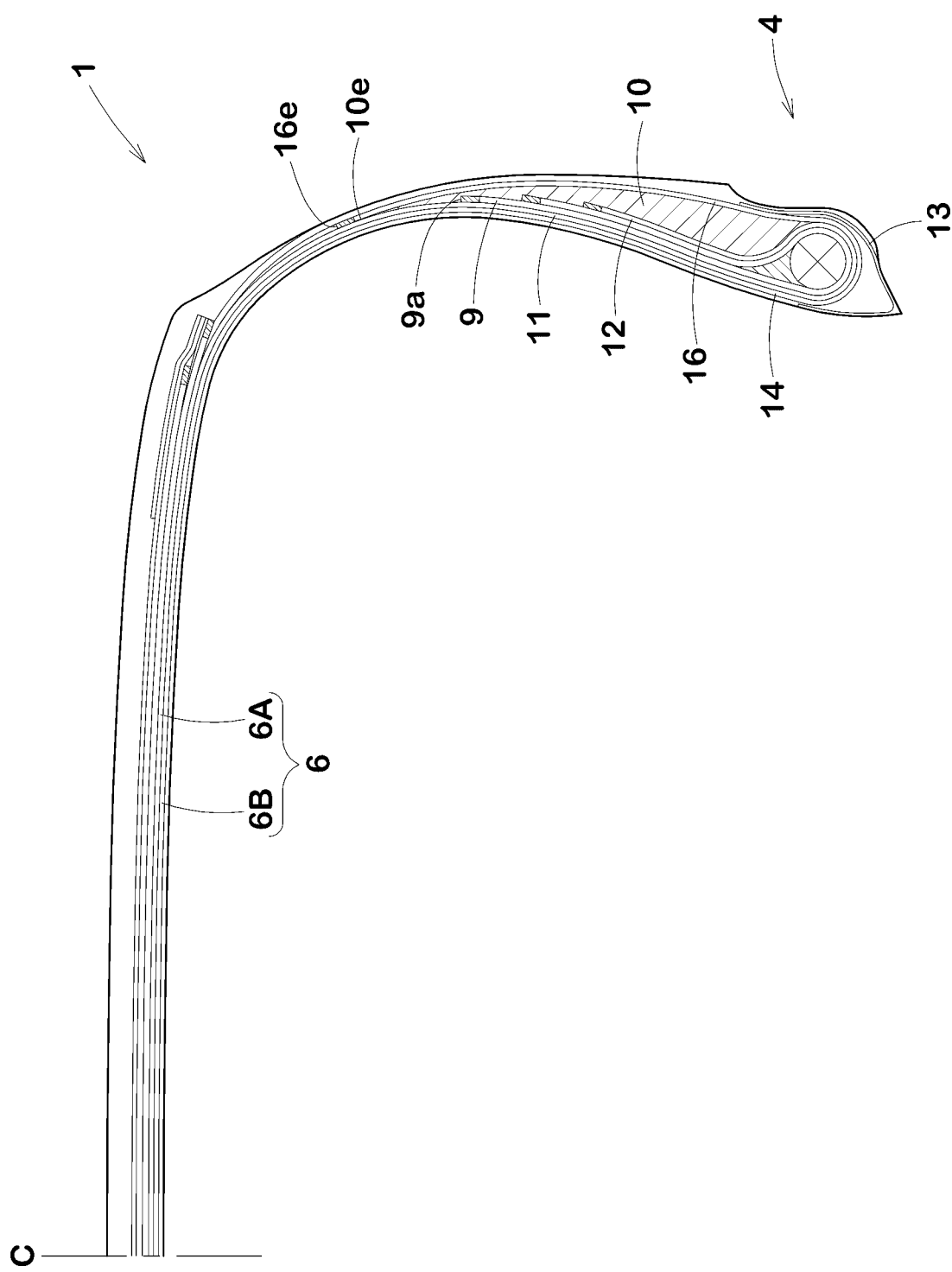
FIG. 5 is a cross-sectional view of a pneumatic tire as still another embodiment of the present invention.

FIG. 5 is a cross-sectional view of a pneumatic tire 1 as still another embodiment of the present invention. The same components as those of the former embodiments are denoted by the same reference numerals, and the description thereof will be omitted. In this embodiment, as shown in FIG. 5, the carcass 6 comprises a second carcass ply 6B disposed on the inside of the first carcass ply 6A, namely, on the radially inside of the first carcass ply 6A in the tread portion 2.

The second carcass ply 6B in this embodiment extends between the bead portions 4 and turned up around the bead core 5 in each of the bead portions 4 from the axially inside to the axially outside so as to have a pair of turned-up portions 16 and a main portion 14 therebetween.

The radially outer edge 16e of the turned-up portion 16 of the second carcass ply 6B is disposed at a different radial height than that of the radially outer edge 10e of the axially outer rubber layer 10. Thereby, the stress during traveling is effectively dispersed.

Further, the radially outer edge 16e of the turned-up portion 16 of the second carcass ply 6B is disposed radially outside the radially outer edge 9a of the bead reinforcing cord layer 9. Thereby, the durability is further improved.

While detailed description has been made of preferable embodiments of the present invention, the present invention can be embodied in various forms without being limited to the illustrated embodiments.

Comparison Tests

Based on the tire structures shown in FIGS. 1 and 5, pneumatic tires of sizes 270/660R18 and 310/710R18 for front wheels and rear wheels, respectively, of a racing car were experimentally manufactured as test tires (Working example tires Ex.1-Ex.16 and Comparative example tires Ref.1 and Ref.1) and tested for the durability and grip performance, and the tire weight was measured.

The specifications of these test tires are shown in Table 1.

<Durability Test>

Using a tire test drum, each test tire of size 270/660R18 inflated to 200 kPa was continuously run at 200 km/h under a vertical tire load of 9.0 kN, and the running distance until damage was occurred on the bead portions was measured. The results are indicated in Tables 1 and 2 by an index based on Comparative example tire Ref.1 being 100, wherein the larger the number, the better the durability.

"bead reinforcing cord layer height" means the ratio (%) of the radial height of the radially outermost end of the bead reinforcing cord layer from the bead base line to the tire section height; and "turned-up portion height" means the ratio (%) of the radial height of the radially outer edge of the turned-up portion of the first carcass ply.

TABLE 1

| Tire | Ref. 1 | Ref. 2 | Ref. 3 | Ex. 1 | Ex. 2 | Ex. 3 | Ex. 4 | Ex. 5 | Ex. 6 | Ex. 7 |
|---|---|---|---|---|---|---|---|---|---|---|
| tire structure | FIG. 1 | FIG. 1 | FIG. 1 | FIG. 1 | FIG. 1 | FIG. 1 | FIG. 1 | FIG. 1 | FIG. 1 | FIG. 1 |
| H1/H (%) | 30 | 10 | 20 | 20 | 20 | 20 | 20 | 20 | 20 | 20 |
| L1 (mm) | 5 | 5 | 3 | 5 | 5 | 5 | 5 | 5 | 5 | 5 |
| axially outer rubber layer height (%) | 60 | 60 | 60 | 60 | 50 | 75 | 60 | 60 | 70 | 60 |
| bead reinforcing cord layer height (%) | 50 | 50 | 50 | 50 | 50 | 50 | 40 | 65 | 65 | 50 |
| turned-up portion height (%) | 35 | 35 | 35 | 35 | 35 | 35 | 35 | 35 | 35 | 25 |
| Ha (mm) | 4.5 | 4.5 | 4.5 | 4.5 | 4.5 | 4.5 | 4.5 | 4.5 | 4.5 | 4.5 |
| Hb (mm) | 1.0 | 1.0 | 1.0 | 1.0 | 1.0 | 1.0 | 1.0 | 1.0 | 1.0 | 1.0 |
| E*2 (MPa) | 120 | 120 | 120 | 120 | 120 | 120 | 120 | 120 | 120 | 120 |
| E*1 (MPa) | 80 | 80 | 80 | 80 | 80 | 80 | 80 | 80 | 80 | 80 |
| durability | 100 | 94 | 98 | 105 | 103 | 106 | 103 | 106 | 106 | 104 |
| grip performance | 100 | 98 | 101 | 103 | 103 | 103 | 103 | 96 | 98 | 101 |
| tire weight | 100 | 92 | 99 | 98 | 97 | 100 | 97 | 98 | 100 | 97 |
| overall score | 100 | 100.1 | 100 | 110.4 | 109.4 | 109.2 | 109.4 | 103.8 | 103.9 | 108.3 |

TABLE 2

| Tire | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|
| tire structure | FIG. 1 | FIG. 1 | FIG. 1 | FIG. 1 | FIG. 1 | FIG. 1 | FIG. 1 | FIG. 1 | FIG. 5 |
| H1/H (%) | 20 | 20 | 20 | 20 | 20 | 20 | 20 | 20 | 20 |
| L1 (mm) | 5 | 5 | 5 | 5 | 5 | 5 | 5 | 5 | 5 |
| axially outer rubber layer height (%) | 60 | 60 | 60 | 60 | 60 | 60 | 60 | 60 | 60 |
| bead reinforcing cord layer height (%) | 50 | 55 | 50 | 50 | 50 | 50 | 50 | 50 | 50 |
| turned-up portion height (%) | 50 | 50 | 35 | 35 | 35 | 35 | 35 | 35 | 35 |
| Ha (mm) | 4.5 | 4.5 | 2.5 | 6.5 | 4.5 | 4.5 | 4.5 | 4.5 | 4.5 |
| Hb (mm) | 1.0 | 1.0 | 1.0 | 1.0 | 0.7 | 2.1 | 1.0 | 1.0 | 1.0 |
| E*2 (MPa) | 120 | 120 | 120 | 120 | 120 | 120 | 70 | 150 | 120 |
| E*1 (MPa) | 80 | 80 | 80 | 80 | 80 | 80 | 80 | 80 | 80 |
| durability | 106 | 106 | 100 | 106 | 105 | 106 | 102 | 106 | 108 |
| grip performance | 96 | 103 | 98 | 103 | 103 | 103 | 101 | 98 | 100 |
| tire weight | 98 | 101 | 95 | 101 | 97.5 | 100 | 98 | 98 | 104 |
| overall score | 103.8 | 108.1 | 103.2 | 108.1 | 110.9 | 109.2 | 105.1 | 106 | 103.9 |

<Grip Performance Test>

The test tires were mounted on the front and rear wheels of a racing car with a 3800 cc engine, and the grip performance was evaluated by the test driver based on the response, stiffness and stability during the racing car was running on a dry asphalt road of a test circuit course. (Front and rear tire pressure: 200 KPa)

The results are indicated in Tables 1 and 2 by an index based on comparative example tire Ref.1 being 100, wherein the larger the number, the better the grip performance.

<Tire Weight>

The weight of each test tire was measured, and the results are indicated in Tables 1 and 2 by an index based on comparative example tire Ref.1 being 100, wherein the smaller the number, the lighter the weight.

In the items of Tables 1 and 2,

"overall score" means durability×grip/tire weight, wherein the larger value is better;

"axially outer rubber layer height" means the ratio (%) of the radial height of the radially outer edge of the axially outer rubber layer from the bead base line to the tire section height;

From the test results, it was confirmed that, as compared with the comparative example tires, the tires according to the present invention were improved in the durability and exhibited excellent grip performance although the tire weight was lighter.

REFERENCE SIGNS LIST 1 pneumatic tire
4 bead portion
5 bead core
6 carcass
8 bead apex rubber
9 bead reinforcing cord layer
9A axially inner first part
9B axially outer second part
9e outer end (edge)
11 main portion
12 turned-up portion
H tire section height
H1 bead apex rubber height

The invention claimed is:

1. A pneumatic tire comprising:
a pair of bead portions with a bead core embedded therein,
a carcass extending between the pair of bead portions, and
a bead apex rubber disposed in each of the bead portions and extending radially outwardly from the bead core therein, and
a bead reinforcing cord layer disposed in each of the bead portions and composed of a ply of cords,
wherein
the carcass comprises
a first carcass ply extending between the bead portions and turned up around the bead core in each of the bead portions from the axially inside to the axially outside so as to have a pair of turned-up portions and a main portion therebetween, and
a second carcass ply disposed outside the first carcass ply and extending between the bead portions without being turned up around the respective bead cores so as to have radially inner edges terminated axially outside the respective bead cores,
the bead apex rubber has a radially outer edge at a radial height of from 15% to 25% of a tire section height, each height measured radially outwardly from the bead base line,
the bead reinforcing cord layer comprises
an axially inner first part disposed on the axially outside of the main portion of the first carcass ply, and
an axially outer second part disposed on the axially inside of the turned-up portion of the first carcass ply and extending from the axially inner first part through a radially inner side of the bead core, and
the axially outer second part has a radially outer edge which is radially outwardly spaced apart from the radially outer edge of the turned-up portion by at least 5 mm in a radial direction of the tire,
wherein
each of the bead portions is provided with an axially outer rubber layer disposed axially outside the turned-up portion and axially inside the second carcass ply, and
each sidewall portion of the tire is provided with a sidewall rubber disposed on the axially outside of the second carcass ply.

2. The pneumatic tire according to claim 1, wherein the bead reinforcing cord layer has a contact section where the axially inner first part and the axially outer second part are in contact with each other.

3. The pneumatic tire according to claim 2, wherein the radially outer edge of the axially inner first part is radially outwardly spaced apart from the radial outer edge of the axially outer second part by at least 5 mm in the radial direction of the tire.

4. The pneumatic tire according to claim 3, wherein the radially outer edge of the bead reinforcing cord layer is positioned at a radial height of from 45% to 60% of the tire section height, each height measured radially outwardly from the bead base line.

5. The pneumatic tire according to claim 4, wherein the radially outer edge of the turned-up portion is positioned at a radial height of from 30% to 45% of the tire section height, each height measured radially outwardly from the bead base line.

6. The pneumatic tire according to claim 5, wherein the radially outer edge of the axially outer rubber layer is radially outwardly spaced apart from the radial outer edge of the bead reinforcing cord layer by at least 5 mm in the radial direction of the tire.

7. The pneumatic tire according to claim 6, wherein a complex elastic modulus $E^*2$ of the axially outer rubber layer is in a range from 125% to 175% of a complex elastic modulus $E^*1$ of the bead apex rubber.

8. The pneumatic tire according to claim 7, wherein the radially outer edge of the axially outer rubber layer is positioned at a radial height of from 55% to 70% of the tire section height, each height measured radially outwardly from the bead base line.

9. The pneumatic tire according to claim 8, wherein a radial dimension H2 of the contact section is 15% to 35% of the tire section height.

10. A pneumatic tire comprising:
a pair of bead portions with a bead core embedded therein,
a carcass extending between the pair of bead portions, and
a bead apex rubber disposed in each of the bead portions and extending radially outwardly from the bead core therein, and
a bead reinforcing cord layer disposed in each of the bead portions and composed of a ply of cords,
wherein
the carcass comprises
a first carcass ply extending between the bead portions and turned up around the bead core in each of the bead portions from the axially inside to the axially outside so as to have a pair of turned-up portions and a main portion therebetween, and
a second carcass ply disposed inside the first carcass ply and extending between the bead portions and turned up around the bead core in each of the bead portions from the axially inside to the axially outside so as to have a pair of turned-up portions and a main portion therebetween,
the bead apex rubber has a radially outer edge at a radial height of from 15% to 25% of a tire section height, each height measured radially outwardly from the bead base line,
the bead reinforcing cord layer comprises
an axially inner first part disposed on the axially outside of the main portion of the first carcass ply, and
an axially outer second part disposed on the axially inside of the turned-up portion of the first carcass ply and extending from the axially inner first part through a radially inner side of the bead core, and
the axially outer second part has a radially outer edge which is radially outwardly spaced apart from the radially outer edge of the turned-up portion by at least 5 mm in a radial direction of the tire,
wherein
each of the bead portions is provided with an axially outer rubber layer disposed axially outside the turned-up portion of the first carcass ply and axially inside the turned-up portion of the second carcass ply, and
each sidewall portion of the tire is provided with a sidewall rubber disposed on the axially outside of the turned-up portion of the second carcass ply.

11. The pneumatic tire according to claim 10, wherein the radially outer edge of the turned-up portions of the second carcass ply are disposed radially outside the radially outer edge of the bead reinforcing cord layer.

12. The pneumatic tire according to claim 10, wherein the bead reinforcing cord layer has a contact section where the axially inner first part and the axially outer second part are in contact with each other.

13. The pneumatic tire according to claim 12, wherein the radially outer edge of the axially inner first part is radially outwardly spaced apart from the radial outer edge of the axially outer second part by at least 5 mm in the radial direction of the tire.

14. The pneumatic tire according to claim 13, wherein the radially outer edge of the bead reinforcing cord layer is positioned at a radial height of from 45% to 60% of the tire section height, each height measured radially outwardly from the bead base line.

15. The pneumatic tire according to claim 14, wherein the radially outer edge of the turned-up portion is positioned at a radial height of from 30% to 45% of the tire section height, each height measured radially outwardly from the bead base line.

16. The pneumatic tire according to claim 15, wherein the radially outer edge of the axially outer rubber layer is radially outwardly spaced apart from the radial outer edge of the bead reinforcing cord layer by at least 5 mm in the radial direction of the tire.

17. The pneumatic tire according to claim 16, wherein a complex elastic modulus $E^*2$ of the axially outer rubber layer is in a range from 125% to 175% of a complex elastic modulus $E^*1$ of the bead apex rubber.

18. The pneumatic tire according to claim 17, wherein the radially outer edge of the axially outer rubber layer is positioned at a radial height of from 55% to 70% of the tire section height, each height measured radially outwardly from the bead base line.

19. The pneumatic tire according to claim 18, wherein the radially outer edge of the turned-up portion of the second carcass ply is radially outside the radially outer edge of the axially inner first part of the bead reinforcing cord layer which is radially outside the radially outer edge of the axially outer second part of the bead reinforcing cord layer which is radially outside the radially outer edge of the turned-up portion of the first carcass ply.

20. The pneumatic tire according to claim 19, wherein a radial dimension H2 of the contact section is 15% to 35% of the tire section height.

* * * * *